United States Patent
Pfister et al.

[11] Patent Number: 5,918,803
[45] Date of Patent: Jul. 6, 1999

[54] POWER REGULATING SYSTEM FOR THE BURNER OF A HEATER

[75] Inventors: Wolfgang Pfister; Peter Reiser, both of Esslingen, Germany

[73] Assignee: J. Eberspächer GmbH & Co., Esslingen, Germany

[21] Appl. No.: 08/836,683

[22] PCT Filed: Mar. 1, 1996

[86] PCT No.: PCT/DE96/00370

§ 371 Date: Dec. 19, 1997

§ 102(e) Date: Dec. 19, 1997

[87] PCT Pub. No.: WO96/28313

PCT Pub. Date: Sep. 19, 1996

[30] Foreign Application Priority Data

Mar. 9, 1995 [DE] Germany ............... 195 08 422
Mar. 29, 1995 [DE] Germany ............... 195 11 545

[51] Int. Cl.⁶ ............... G05D 23/00; F23D 5/12
[52] U.S. Cl. ............... 236/1 EB; 236/15 BD; 431/12
[58] Field of Search ............... 236/15 BD, 1 EB; 431/12; 237/12.3 C

[56] References Cited

U.S. PATENT DOCUMENTS

| | | | |
|---|---|---|---|
| 2,527,430 | 10/1950 | Kniveton | 236/1 E |
| 4,585,161 | 4/1986 | Kusama et al. | 236/15 BD |
| 4,613,072 | 9/1986 | Kikuchi et al. | 237/12.3 C |
| 5,630,408 | 5/1997 | Versluis | 431/12 |

FOREIGN PATENT DOCUMENTS 4323586  1/1995  Germany .

OTHER PUBLICATIONS

WO84/02402 Jun. 1984 PCT, Broach et al.

Primary Examiner—William Wayner
Attorney, Agent, or Firm—McGlew and Tuttle, P.C.

[57] ABSTRACT

A power regulating system make it possible to switch on a plurality of power stages with different air flow rates and different fuel flow rates on the burner of the heater. In addition, noise level is optimized, since the blower that maintains the air flow rate turns with a constant output and only the fuel flow rate is modified to regulate the heating power.

18 Claims, 1 Drawing Sheet

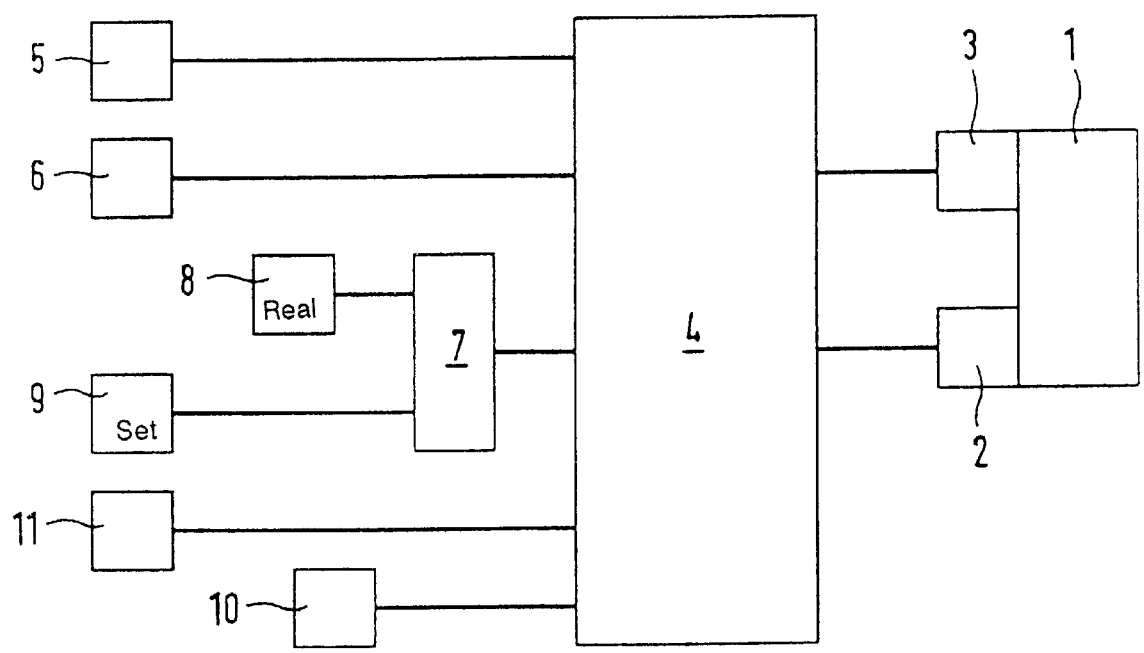

POWER REGULATING SYSTEM FOR THE BURNER OF A HEATER

FIELD OF THE INVENTION

The present invention pertains to the output control of a burner of a heater operated with excess air, especially of an air heater, especially for interior spaces or driver's cabs of motor vehicles, with a plurality of or many power stages, which differ both in terms of the fuel throughput and by the air throughput generated by a controllable blower.

BACKGROUND OF THE INVENTION

A plurality of adjacent power stages can be set in heaters currently used for interior spaces of vehicles, especially the driver's cabs of trucks. In general, a thermostatic monitoring of the room temperature as well as automatic regulation of the heat output are provided, and, depending on the variance of the room temperature, different power stages of the heater are switched on by an automatic unit, or the latter unit performs a changeover between the power stages in order to bring the room temperature to the set value or to maintain it at the set value. If the doors or windows of the vehicle space remain closed for a long time or remain open without change (and not excessively), a final stage, in which a high-low control takes place with more or less rapid change between adjacent power stages and the room temperature remains constant within relatively narrow limits, will become established after a starting phase of variable duration.

At all power stages, the air and fuel throughputs are essentially such that a relative optimum of consumption is obtained with respect to the fuel needed. Different power stages therefore differ regularly in terms of both the fuel throughput and the air throughput and consequently also in terms of the output of the burner blower, which is primarily responsible for the air throughput. For reasons of comfort, the air throughput and the fuel throughput are not changed, in general, abruptly at the time of a changeover between power stages, but a phase of transition of varying duration, during which the values of the air and fuel throughputs are adjusted to the standard values of the power stage currently being set more or less continuously and with a time delay of variable duration, is passed through after a changeover between the power stages. Concerning the output of the blower of the burner, which maintains the air throughput, this means that the blower output is raised or lowered "gradually" during the said phase of transition at the time of a changeover between heating output stages.

The noises of the blower may also be felt to be a nuisance, especially when the driver spends a rather long time in the parked vehicle with the engine not running during the nighttime hours or during prolonged breaks.

SUMMARY AND OBJECTS OF THE INVENTION

The object of the present invention is therefore to ensure a higher level of comfort for heaters of the above-described type.

This object is accomplished according to the present invention by a control or regulation of the fuel throughput being able to be switched on at approximately constant air throughput and/or constant blower output.

The present invention is based on the general idea of also making possible a primarily noise-optimized control or regulation, besides an essentially consumption-optimized control or regulation of the heater. While the values of the air and fuel throughputs in the mode of operation mentioned in the introduction are directed toward a maximum heat output compared with the amount of fuel needed, taking into account at the same time the requirement that exhaust gases with a low pollutant level shall be generated, a constant, usually relatively low blower output can be combined with variable burner throughput in the mode of operation additionally provided according to the present invention, in order to be able to guarantee a variable heat output at constant blower noise. Even though a certain increase in fuel consumption has to be accepted compared with the heat output in this mode of operation, which is designed for increasing comfort, this extra consumption remains rather small and is certainly justified by the constant blower noises, which are relatively tolerable even with the vehicle engine not running and by the increase in comfort which is associated with it. No losses need to be accepted concerning the absence of pollutants in the exhaust gases, because a sufficient excess air is still maintained even in the noise-optimized mode of operation.

Regarding advantageous features of the present invention, reference is made to the claims as well as the following description of a preferred embodiment, which will be explained on the basis of the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

The only figure shows a schematic representation of a heater with an output control according to the present invention, which is shown in the manner of a block diagram.

DESCRIPTION OF THE PREFERRED EMBODIMENT

A burner 1 of a heater, not shown specifically, has a variable-amount fuel feed means 2 as well as a controllable blower 3, so that the burner output can be changed by varying the fuel and air throughputs.

Both the fuel feed means 2 and the blower 3 are usually actuated or driven electrically.

The fuel feed means 2 as well as the output of the blower 3 are controlled by means of a control device 4, which makes it possible to switch on a plurality of, usually very many power stages of the burner 1. Different power stages differ, in general, in terms of both the air throughput and the fuel throughput of the burner 1. At the time of a changeover between two power stages, the control device 4 may initially initiate a phase of transition, during which the amount of fuel being fed to the burner 1 by the fuel feed means 2, on the one hand, and the output of the blower 3, and consequently the air throughput of the said burner 1, on the other hand, are changed or adjusted continuously or "gradually" from the actual values of the power stage set previously to the values of the power stage set last.

The values of the air and fuel throughput set after the end of the phase of transition are such that at a relative optimum of the fuel consumption is obtained at least approximately compared with the actual heat output.

According to a first embodiment of the present invention, the different power stages can be set arbitrarily with a switch 5. After the end of the corresponding phase of transition, the control device will then adjust the fuel feed means 2 as well as the blower 3 to the standard values of the air and fuel throughput, which are associated with the corresponding power stage, and maintain this setting.

A handle (setting element) 6 is additionally provided, with which the amount of fuel fed to the burner 1 can be changed within predetermined limits without changing the blower output preset by the switch 5. A power stage with relatively low blower output and corresponding with a relatively low blower noise can thus be set by means of the switch 5 within limits predetermined by the design, and the heat output can be increased and optionally also reduced by means of the handle 6 as needed.

According to another embodiment, provisions may be made additionally or alternatively to control the room temperature in the driver's cab, etc., of a motor vehicle.

A controller 7 with a thermostat 8 detecting the actual value of the room temperature and with a setting member 9 for arbitrarily presetting a temperature set point is used for this purpose. The controller 7 will send a signal reflecting the variance of the temperature to the control device 4, which will then switch on different power stages of the burner in a predetermined manner, optionally taking into account the outside temperature, which may be detected by an additional thermostat 10, until the temperature set point set with the setting member 9 is reached and is finally maintained at an extensively constant value by the output of the burner 1 being changed over alternately between two adjacent power stages.

Depending on the setting of a changeover switch 11, the room temperature then continues to be maintained within a preset range of variation by continuously alternating between the adjacent power stages in the manner of a high-low control, or a changeover is made to a special mode of operation, in which the power stage with the lower blower output is switched on among the adjacent power stages, and that blower stage remains on, while the output of the burner 1 is otherwise controlled by varying the fuel throughput, i.e., by intervening in the fuel feed means 2.

The changeover switch 11 may also be optionally eliminated, and a changeover is always made to the latter mode of operation when the temperature set point is reached.

Should the room temperature in the interior space of the vehicle deviate from the set value selected to a greater extent due to external effects, e.g., due to a door of the vehicle being left open for a longer time, there is an automatic changeover, at least temporarily, to the mode of operation in which the control device 4 selects different power stages of the burner 1 depending on the temperature variance.

If the control device makes it possible to switch on a plurality of regulating steps with a ratio of fuel throughput to air throughput predetermined according to a characteristic, it is possible, in a special mode of operation with constant air throughput, i.e., constant blower output, to raise or lower the heat output by one power stage compared with a regulating step simply by changing the fuel throughput. The blower output must be changed only if the second regulating step is needed. However, this hardly ever happens during a prolonged stop of the vehicle with the doors and windows open, because a quasi-steady-state will now become established after a certain time, and only minor changes in the heat output are needed to maintain this.

While a specific embodiment of the invention has been shown and described in detail to illustrate the application of the principles of the invention, it will be understood that the invention may be embodied otherwise without departing from such principles.

We claim:

1. An output control of a burner operated with excess air, especially of a vaporizing burner, of a heater, especially an air heater especially for interior spaces or driver's cabs of motor vehicles, comprising:

variable amount fuel feed means for feeding fuel to the burner in a variable amount;

a volume rate of flow controllable blower;

power stage means providing a plurality of power stages, which differ in terms of both the fuel output control and the air throughput brought about by said controllable blower; and means providing a power stage having a constant air throughput to the burner while simultaneously varying the fuel flow to the burner.

2. The control in accordance with claim 1, wherein:

at a time of a changeover between the power stages, said power stage means changes the fuel throughput and the blower output continuously between the operating values associated with the power stages during a phase of transition which takes place automatically.

3. The control in accordance with claim 1 wherein:

an automatic operation can be switched on, during which different power stages are switched on by said power stage means at first depending on a variance of the room temperature until a state is reached in which the desired room temperature is many a high-low control alternating between two adjacent power stages, and that the power stage with the lower blower output is or continues to be switched on among these power stages, and the further output control of the burner is performed at a blower output being maintained at an essentially constant value by varying the burner throughput.

4. The control in accordance with claim 3, wherein:

there is again a changeover to the mode of operation with changeover between different power stages if a longer-term variance of the room temperature and/or a variance of the room temperature exceeding a threshold value appears.

5. The control in accordance with claim 1, wherein:

said power stage means includes power stage preset means for setting many closely adjacent power stages with an air throughput to fuel throughput ratio preset according to a characteristic, and that it is possible to change the heat output by varying the fuel throughput at constant air throughput at every or almost every power stage.

6. The control in accordance with claim 1, wherein the burner is always operated with excess air.

7. An interior space heater burner output control system, comprising:

a burner operated with excess air;

variable amount fuel feed means for feeding fuel to the burner in a variable amount;

a volume rate of flow controllable blower;

power stage means providing a plurality of power stages, each power stage differing from another power stage in terms of both fuel throughput control and air throughput brought about by said controllable blower; and throughput means providing a power stage having a constant air throughput to the burner while simultaneously varying the fuel flow to the burner.

8. The control system in accordance with claim 7, wherein:
at a time of a changeover between the power stages, said power stage means changes the fuel throughput and the blower output continuously between the operating values associated with the power stages during a phase of transition which takes place automatically.

9. The control system in accordance with claim 7, wherein:
an automatic operation can be switched on, during which different power stages are switched on by said power stage means at first depending on a variance of the room temperature until a state is reached in which the desired room temperature is maintained by a high-low control alternating between two adjacent power stages, and that the power stage with the lower blower output is or continues to be switched on among these power stages, and the further output control of the burner is performed at a blower output being maintained at an essentially constant value by varying the burner throughput.

10. The control system in accordance with claim 9, wherein: there is again a changeover to the mode of operation with changeover between different power stages if a longer-term variance of the room temperature and/or a variance of the room temperature exceeding a threshold value appears.

11. The control system in accordance with claim 7, wherein: said power stage means includes power stage preset means for setting many closely adjacent power stages with an air throughput to fuel throughput ratio preset according to a characteristic, and that it is possible to change the heat output by varying the fuel throughput at constant air throughput at every or almost every power stage.

12. The control system in accordance with claim 7, wherein the burner is a vaporizing burner always operated with excess air.

13. A process for controlling a burner of an interior space heater output control system, comprising:
operating a burner with excess air;
providing a variable amount fuel feed means for feeding fuel to the burner in a variable amount;
providing a volume rate of flow controllable blower;
providing a plurality of power stages, each power stage differing from another power stage in terms of both fuel output control and air throughput brought about by said controllable blower; and
controlling the fuel throughput to provide a power stage having a constant air throughput to the burner while simultaneously varying the fuel flow to the burner.

14. The process in accordance with claim 13, wherein:
at a time of a changeover between the power stages, said power stage means changes the fuel throughput and the blower output continuously between the operating values associated with the power stages during a phase of transition which takes place automatically.

15. The process in accordance with claim 13, wherein:
an automatic operation can be switched on, during which different power stages are switched on by said power stage means at first depending on a variance of the room temperature until a state is reached in which the desired room temperature is maintained by a high-low control alternating between two adjacent power stages, and that the power stage with the lower blower output is or continues to be switched on among these power stages, and the further output control of the burner is performed at a blower output being maintained at an essentially constant value by varying the burner throughput.

16. The process in accordance with claim 15, wherein: there is again a changeover to the mode of operation with changeover between different power stages if a longer-term variance of the room temperature and/or a variance of the room temperature exceeding a threshold value appears.

17. The process in accordance with claim 13, wherein: said power stage means includes power stage preset means for setting many closely adjacent power stages with an air throughput to fuel throughput ratio preset according to a characteristic, and that it is possible to change the heat output by varying the fuel throughput at constant air throughput at every or almost every power stage.

18. The process in accordance with claim 13, wherein the burner is a vaporizing burner always operated with excess air.

* * * * *